Aug. 20, 1929. A. P. ANDERSON 1,725,171
PUFFING
Filed April 21, 1924
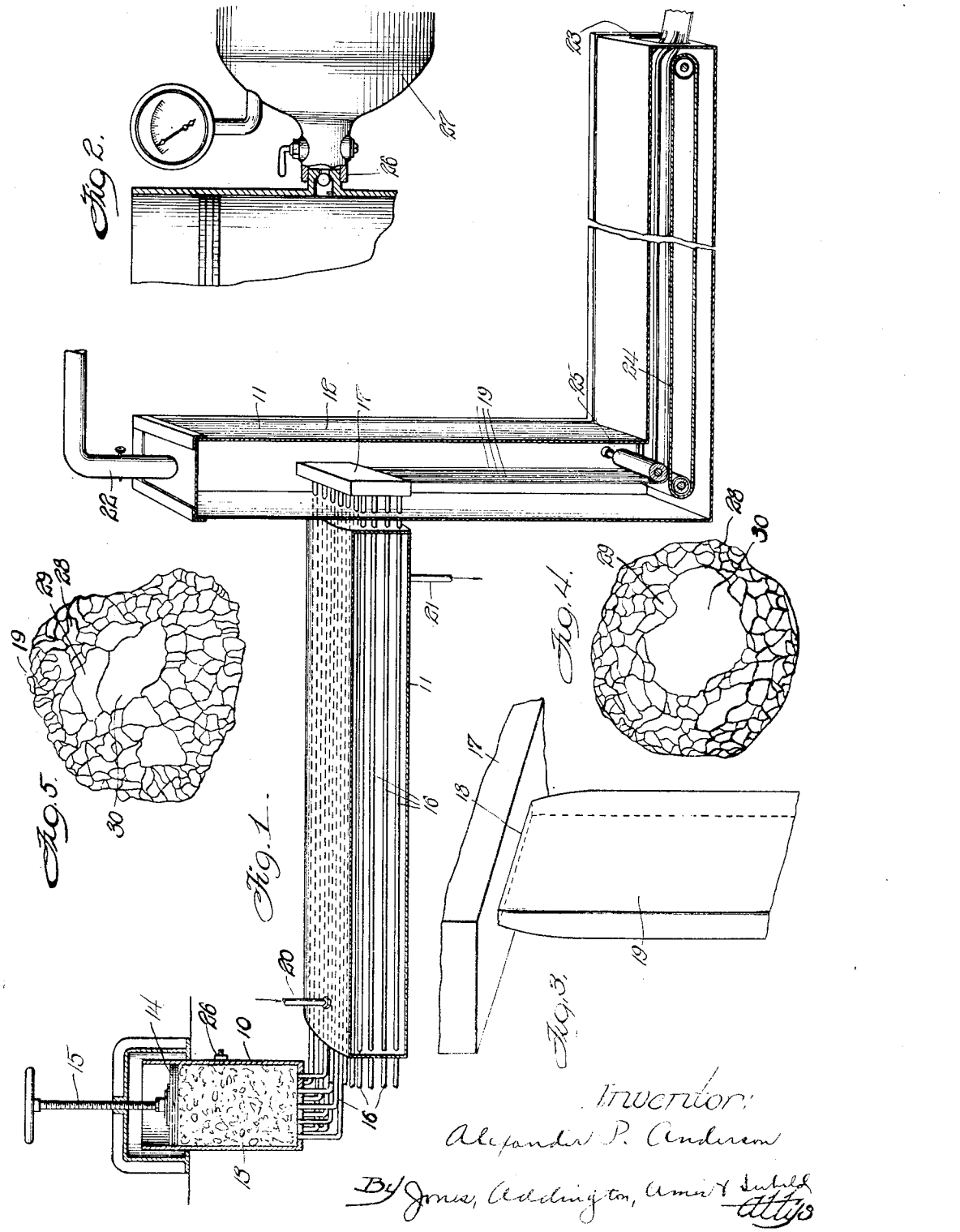

Patented Aug. 20, 1929.

1,725,171

UNITED STATES PATENT OFFICE.

ALEXANDER PIERCE ANDERSON, OF RED WING, MINNESOTA, ASSIGNOR TO ANDERSON PUFFED RICE COMPANY, OF CHICAGO, ILLINOIS, A CORPORATION OF NEW JERSEY.

PUFFING.

Application filed April 21, 1924. Serial No. 708,039.

My invention relates to the production of a continuous puffed or porous product, including the method, apparatus and product which are all closely related. At present, the invention is considered to be of most importance in connection with food products, although in its broad aspects it is not limited to food products.

One of the objects of my invention is to devise a way of puffing or rendering porous products from certain materials which have not heretofore been susceptible of such treatment.

A further object of my invention is to devise a way in which certain materials such, for instance, as flour can be quickly transformed into porous cooked food products.

A further object of my invention is to devise a method of making cooked puffed food products which method is exceedingly flexible whereby variations can be readily made as to the degree of cooking and the degree of porosity of the product.

In carrying out my invention in making puffed food products, I may reduce food material containing starch and moisture to a state in which it will flow under pressure, subject this material to pressure and heat to render it plastic, tenacious and resistant to the escape of moisture, cause this material to be released from pressure through an orifice to cause the moisture therein to expand as steam and thereby disrupt the starch granules and puff the material, and subject this material to heat as it emerges from the orifice to form a crust on the outside of the material and to maintain the moisture within the material in a gaseous state while the material is drying to give it increased porosity. I may also inject into the plastic material a gas, for instance, carbon dioxide, to increase the porosity of the product, or to enable variations to be made in the heat or other treatment.

The pressure and temperature used may vary depending on the material treated and the product desired. By this method plastic starch material and starch material flours may be greatly expanded and made porous, or "puffed", the resulting product being crisp in its structure and resembling bread or crackers or certain products like puffed rice and puffed wheat now on the market. Also, certain fruits, tubers and the like containing starch and comparatively large percentage of water can be quickly cooked, dried and made porous or puffed, converting them into food products. Also, by this method pure starches can be expanded in size and volume, exploding the starch granules into minute particles, making a porous puffed product.

In my prior methods of puffing material, as disclosed in my Patents Nos. 707,892, 769,289, 874,279, 990,093, 1,035,834, 1,035,835, 1,035,836 and 1,035,837 it was essential that the material for puffing be in a lump form, as grain, or particles of sufficient size to puff individually into definite expanded bodies which become enlarged copies of the original grain or lump; thus grains of rice, wheat, sago, tapioca, rolled up flour balls, pellets of corn flour and rolled up balls of pure starch could be puffed by my prior inventions. However, flours from such grain could not be puffed without first being made up into lumps or pellets.

This limitation I have now overcome by my new process which is applicable to all flour starches and mixtures of the same in any combination, which could not be puffed by my previous methods.

My new process has this advantage also over my former process in that the material for treatment need not be in an air-dried condition but can have various percentages of moisture.

The process described in my above-mentioned patents depended essentially on steam pressures surrounding and within each grain or kernel. No other pressure, that is, to say, no mechanical pressure was used. In my new process I depend largely on mechanical pressure in combination with steam or other expansive pressure, for this reason; starch material flours are products made from very solid compact bodies, such as seeds, grains and the like which have been ground up or pulverized. In these grains nature has stored up in a very small space a large amount of food, the grains being very compact; in fact, as compact as can be obtained by using very high pressure on the flour made from this grain. I estimate that it requires a pressure of about five thousand pounds per square inch to reduce flour to a condition in which it is as solid and compact as it is in the grains of rice, wheat, corn and the like from which it is made. My method contemplates the use of very high pressure, in order to make the material acted on substantially as compact as it is when in the seeds or grains.

I also have found that it requires a steam pressure of about 175 pounds per square inch to disrupt starch granules and puff a grain of rice or wheat. Furthermore, such grains before puffing must be cooked, not raw, so as to be plastic, tenacious and pliable. This requires a temperature of from 200 to 400° F. depending on the material under treatment. I have succeeded in combining all of these essential conditions in one process, including mechanical pressure, steam pressure cooking temperature, disruption of starch granules by expansion of steam, variation of moisture percentages and quick drying, making a final product which is greatly expanded and porous like bread, crackers, biscuit and the like.

Another advantage in my new process is that any mixture of flours, starches and so forth can be prepared and puffed together to form one product, a combination of all of them.

My new process does not depend on an expansive medium resulting from gas generated in fermentation due to yeast nor due to added chemicals, such as baking powders which generate carbon dioxide gas. It is well known that when yeast and baking powder are used for bread making, only certain flours like glutinous wheat flour can be used. In my new process, I do not depend on this property of the flour but depend on steam at high tension for the expansive medium taking advantage of another property of starch materials and flours which I have discovered to-wit; that when starch is heated up to a temperature of 250 to 375° F., especially when under pressure, it is plastic and tenacious, much the same as gluten. Since the material is plastic and tenacious, the particles resulting from the disrupted starch granules become binders and cement together not only all the starch contained in the material treated, but also any non-starch substances, such as the bran gluten and broken-up cell walls. Of course, when the gluten material is used, the gluten aids in the expansion.

I may also assist the expansible force of the steam by means of gas, such as carbon dioxide gas injected into the dough or other material so that when the material is subjected to high mechanical pressure the gas is evenly disseminated throughout the mass and when the material is finally released the gas expands, assisting the steam in maintaining the material in a porous puffed condition and preventing the cells from collapsing.

I will now describe in a general way certain apparatus which I may use in carrying out my process and will thereafter describe various ways in which I may treat various materials, all of these ways embodying the same general method but varying specifically with the material treated and the product desired.

Referring to the drawing in which the apparatus referred to is shown—

Figure 1 is a diagrammatic perspective view showing the pressure chamber, the heating chamber and the drying apparatus;

Fig. 2 is a detailed view showing a connection for a gas tank;

Fig. 3 is an enlarged view showing one of the orifices in the header;

Fig. 4 is a greatly enlarged cross-sectional view of a shred made from wheat flour; and Fig. 5 is an enlarged cross-sectional view of a strip made from corn starch.

The construction shown comprises, in a general way, a pressure chamber 10, in which the material to be treated is placed, a heating chamber 11, through which the material is forced from the pressure chamber, and a drying chamber 12, into which the material to be treated is forced after passing through the heating chamber.

The material 13 in the pressure chamber 10 may be subjected to pressure and forced out of said container by any suitable means, such as a hydraulic press or, as shown, by means of a plunger 14 and operating screw 15.

The material may be forced from this pressure chamber through a number of tubes or pipes 16, which lead from the pressure chamber through the heating chamber to a header 17, located in the drying chamber 12. The header 17 may be provided with a number of orifices 18 (Fig. 3), through which the material being treated escapes under pressure in the form of strips 19 into the drying chamber. The combined cross-sectional area of the orifices from the header should be materially less than the combined cross-sectional area of the tubes 16 so that a substantial resistance will be offered to the escape of material being treated. The heating chamber 11 may be heated by steam under any desired pressure from a steam supply pipe 20, the steam escaping through the exhaust pipe 21.

The drying chamber may be kept at the desired temperature by supplying hot air through the supply pipe 22, the air escaping through the opening 23.

The treated material after escaping through the orifices in the header, in the form of strings or ribbons, moves downwardly onto the conveyor belt 24, which is traveling at substantially the speed at which the material escapes from the orifices. A roller 25, which may be of aluminum, is provided for directing the material into the conveyor.

The pressure chamber 10 may be so designed that any desired pressure may be maintained therein. The pressures desired range from 500 to 5000 pounds per square inch.

The heating chamber may be so designed that any desired steam pressure may be maintained therein, the desired pressures ranging from 5 to 200 pounds per square inch, corresponding to the temperatures of 175° F., 215° F. and 400° F., respectively. The desired temperatures in the drying chamber may range from 400° F. to 600° F. at the point where the material enters the drying chamber and from 215° F. to 300° F. at the point where the material leaves the drying chamber.

In order to be able to supply carbon dioxide or other gases to the material when desired, I may provide a connection, as indicated at 26, to which a pressure gas tank 27 (Fig. 2) may be connected.

I have found in practice that satisfactory results are secured by using ⅜″ pipes for the heating tubes 16, the treating chamber being about six feet long.

I also secure satisfactory results in the drying chamber by locating the conveyor 24 about four feet below the header 17 and making the conveyor about forty feet long.

Figs. 4 and 5 show greatly enlarged cross-sectional views of strips formed by my improved method. Fig. 4 shows a puffed strip made from wheat flour magnified about 30 diameters. This shows the outer cells 28 having thicker walls and much smaller than the inner cells 29 and shows the tendency to form a hollow central portion. These same characteristics are shown in the cross section of the puffed strip formed from corn starch, shown in Fig. 5, which is magnified about 30 diameters.

In order to facilitate an understanding of my method and enable those skilled in the art to understand how the invention may be practiced, I will now describe several ways for treating various materials, the broad underlying method being similar in all.

*Example I.*

I may take wheat flour which may be bolted or finely ground with parts of raw bran removed if desired. Thus wheat semolina may be used. It is not essential that the flours used be finely ground or bolted. They may be coarsely ground whole grains and contain bran and small gritty parts, such as flours known as "mill run." This flour may be mixed in a dough mixer with water and other liquids or flavoring ingredients, giving to the flour a total moisture percentage of from 25 to 35%. This more or less plastic material is then put in the pressure chamber 10 where it may be subjected to a pressure of from 3000 to 5000 pounds per square inch. The material is then forced through the pipes 16 leading through the heating chamber so that the material becomes cooked under compression while passing through these pipes. The moisture contained in the material is confined, absorbs heat units and is ready to burst into steam as soon as the material escapes from the orifices 18. In this instance, a steam pressure of about 175 pounds may be maintained in the heating chamber corresponding to a temperature of 375° F.

In order to maintain pressure in the tubes, it is necessary that the combined cross-sectional area of the orifice be such as to prevent too rapid a flow of material. The orifices may be of any shape desired, round, square or oblong, to form the material into the desired shape.

The material as it passes through the tubes under great pressure and heat becomes fused together and glue like and rubbery in its structure. It is also more or less plastic because of the starch which it contains. This compressed plastic fused cereal flour may now be compared to the material in a grain of cereal, such as rice or wheat, in that it is greatly compressed and reduced in volume as compared with its volume in its flour form. The material in the heating chamber becomes resistant to the rapid escape of the moisture contained therein so that when the material escapes from the orifice and the moisture flashes into steam it greatly enlarges the volume of the material or "puffs" the material. The puffing is instantaneous and explosive. The suddent and great expansion of the material explodes the starch granules and otherwise breaks up the solid rubber like material in substantially the same way as whole grains of cereal were broken up and puffed by my previous methods.

The heat applied renders the product sterile. The high temperature of the material emerging from the nozzle and the explosive effect of the moisture makes drying rapid and easy, a large percentage of the moisture escaping in a few seconds. To further facilitate the drying and to prevent the new puffed and porous product from collapsing, the product is not allowed to cool off at once but emerges directly into the drying chamber 12, where it is subjected to a relatively high temperature at the beginning, higher than the temperature in the heating chamber. As the material travels through the oven on the belt it becomes dry in from 1 to 2 minutes depending on the percentage of moisture in the material.

It is understood that the pressures and temperatures used may be varied to suit conditions and the product desired. By lowering the pressure, the speed of flow of the material at the orifice is reduced. By lowering the temperature in the cooking chamber, less heat is absorbed, and less cooking takes place.

In this process, the percentage of starch in the product being treated can be very small on the one hand, and on the other hand pure starch can be used, the resulting product varying considerably with the amount of starch contained. Thus, wheat bran can be treated without adding any starch to it, since it contains sufficient starch to act as a binder. Wheat flour having any percentage of bran, e. g., 25 to 75 per cent or more, can be treated. When the material contains a very small percentage of starch the puffing is less than when a greater amount of starch is present.

It has been found that when a maximum puffing is desired, a speed of one foot per second of the material at the nozzle or orifice is essential. When the maximum puffing or porosity is not desired the pressure is reduced to cause a slower flow and the temperature in the heating chamber may be correspondingly reduced.

If it is desired that all the starch granules be broken up, a temperature of 325° F. to 400° F. is needed. If only a slight disruption of the starch granules is desired a temperature amounting to 225° F. may be used. If desired, a material which has been previously cooked can be treated. In the case of a previously cooked material, a temperature as low as 165° F. would be sufficient to fuse the starch together and make it plastice enough to be inflated with carbon dioxide gas, thus enabling the material to be puffed without subjecting it to high heat.

Another advantage of being able to use any desired temperature is that I may treat plastic materials which cannot stand high temperatures without scorching and destroying important ingredients, such as acids, volatile substances and flavors, aldehydes, vitamines and the like. The process can be absolutely controlled so as to retain these essential ingredients substantially in their natural state.

*Example II.*

I may take rice flour ground from whole rice or rice grits, flavoring it if desired, and adding enough water to bring this moisture content up to about 35 percent. The flour and water are thoroughly and evenly mixed to make the material as plastic as possible so that it can be forced from the pressure chamber through the heating chamber where it becomes cooked, tenacious, fused together and resistant to the rapid escape of moisture when released. It is well known that rice flour contains no elastic gluten, hence a real dough, such as wheat flour dough cannot be made from it. However, it has been found that a sufficiently plastic mass can be made from it so that it can be forced through the cooking chamber under a somewhat higher pressure than that used with the wheat flour. I have found that the cooking of the starch-containing material tends to make it pass through the tubes more quickly and with less friction than if it were forced through cold. This is due to the fact that the starch in the flour becomes plastic when subjected to heat and moisture, making it "slippery". Furthermore, the heating of the material in the tube causes a further pressure to be developed which has a tendency to move the material on the tubes toward the nozzle where it is released.

As the material passes through the heating chamber, the moisture therein becomes highly heated, so that it expands into steam at the instant it is released from pressure. The material as it escapes from the nozzle is expanded into a cellular porous structure due to the resistance which the material offers to the escape of the moisture.

This resistance is explained as follows: When the material containing moisture is heated under great pressure, the starch granules become hydrated more or less and swells slightly pressing upon each other to such an extent that their surfaces fuse together. This fusion converts the flour into a solid compact fused mass which is resistant to the escape of the moisture contained therein since now the moisture cannot escape by passing in between the granules, but must pass or diffuse through them, which requires some time. Therefore, the more instantaneously the puffing takes place, the larger and more even the puffed product becomes. When the moisture is allowed to diffuse out slowly through the surface of the material, considerably less expansion takes place. This explains the necessity of the high speed that should be given the material at the nozzle. The more rapid the flow, the quicker the pressure release. It will be understood that the pressures and temperatures may be varied as desired within certain limits. By this method rice flour can be made into forms like vermicelli, spaghetti and macaroni which are now made only from wheat flour. By this process, partially cooked products can be quickly prepared for food.

In treating rice flour also, carbon dioxide or other compressed gas can be injected into the compression chamber when desired to assist the steam in puffing the product.

Example III.

Whole wheat, cleaned by the usual methods, is cooked either by boiling, or by steam in a closed vessel until it has become soft and rubbery. The excess water is then drained off and the wheat dried until it has a moisture content of 35 percent. The wheat is now macerated as by putting it through a meat grinder or otherwise grinding it coarsely, the intention being to break up and crush the grain to render the mass plastic. It is then put into the pressure chamber and subjected to a pressure of 4000 to 5000 pounds per square inch and forced through the tubes in a heating chamber.

In this instance, we are dealing with a precooked starch material which contains sufficient moisture to make it plastic enough to be forced through the tubes. The moisture in the material is heated as it flows through the heating chamber, and is ready to burst into steam the instant it emerges from the orifice. The puffing and drying takes place as in the examples previously described. The puffing and drying are made steps in a continuous operation. The flow of the material at the nozzle may be at the rate of about one foot per second. The conveyor which carries the material through the drying chamber travels at a speed slightly greater than the flow of the material at the nozzle so as to pull gently on the string or ribbon to prevent it from curling up or buckling.

The ribbons or strings may be cut off in desired lengths as they flow through the nozzle. This cutting off is possible at a certain time after the material leaves the nozzle. During the first ten seconds or so after it leaves the nozzle, it is too rubbery and plastic to be cut, but as soon as the surface "sets" and a crust forms, the cutting can be done by means of a suitable cutting mechanism.

As previously stated, the combined cross-sectional area of the releasing orifice must be less than the combined cross-sectional area of the tubes leading to the orifice. It has been found that the ratio of these areas can be varied considerably. The ratio may vary from one to four to 1/100. The size of the nozzle determines the amount of the material which can be forced through the cooking tube and thus determines the length of time that the material remains in the cooking tube. By changing the size of the nozzle openings, the mechanical pressure on the material and the temperature in the cooking chamber, it is possible to give the material any desired amount of cooking and any desired amount of porosity. Rice, corn, and other cereal grains may be treated in the same way as wheat grain by cooking or steaming them until soft or more or less plastic when macerated. By this method, puffed rice or corn products can be produced in a short time.

Example IV.

Pure starch, such as corn starch, potato starch, or any starch, no matter what its origin, can be treated and puffed making a porous product in which all of the starch granules are exploded and disrupted so that when the product is dried and ground up, a starch flour results which may be used as a food, in laundry work, or as a dry paste.

In carrying out this method, enough water is added to dry starch to give it a total moisture content of about 40%, or starch can be taken direct from the starch runs where it already contains about this percentage of moisture.

When pure starch is treated, a considerable percentage of moisture must be present in order to make it plastic enough to be forced through the heating or cooking pipe. A pressure of 4000 to 5000 pounds per square inch may be used for forcing the material through the cooking tube, where the starch granules are fused together, making a solid rubbery mass resistant to the escape of moisture. As the material emerges from the orifice, the pressure is almost instantly reduced to atmospheric, and the moisture in the material flashes into steam, inflating and puffing the material. The material is dried just as in the example previously described and may be used in ribbon or strip form, or ground up into a starch flour.

It has been found that pure starches from different sources vary in their moisture content. Thus, potato starch will hold in an air dry condition about 18% moisture while air dry corn starch will hold only about 14%. In treating starches, the smallest percentage of moisture should be used which will permit the material to be forced through the cooking and heating tubes.

Example V.

In this method, a gas such as carbon dioxide is forced into the material which is treated. Wheat flour dough may be used, to which sufficient water is added to make the material plastic. This elastic dough is then preferably divided into small pieces about the size of kernels of corn. These pieces are then put in the compression chamber which is then sealed up air-tight.

Carbon dioxide is then injected into the compression chamber up to a pressure of about 200 pounds per square inch. This gas now becomes intimately mixed with the dough disseminating evenly throughout the whole mass in about two minutes. The carbon dioxide gas is then turned off and the gas charged dough is subjected to a mechanical pressure of from 2000 to 5000 pounds per square inch, depending on the material used and the percentage of moistu.e. Thus, with a dough having 30 percent moisture, a pressure of 5000 pounds would be used but with a dough containing 35 percent moisture 2000 pounds would be enough. This high pressure converts the dough into a very solid compact mass, much the same as a brick. Due to this, the carbon dioxide gas has now become so thoroughly mixed with the dough that it has become gas saturated, even the moisture of the dough holds much of the carbon dioxide gas. The starch granules are also thoroughly saturated with the gas. The gas charged dough is then forced through the heating chamber and into the drying chamber as in the examples previously described.

If desired, the material after being charged with gas may be taken out of the pressure chamber and held for a time after further treatment, as the compressed dough will hold the gas within it for a considerable time, losing it slowly by diffusion. Several hours might elapse before all of the gas would escape.

The purpose of using the gas is explained as follows: it is known that bread is made porous mainly by means of carbon dioxide gas as in the process of fermentation when yeast is used, or as in the case where baking powder is mixed with glutenous flours in which carbon dioxide gas is generated. Bread has also been made by intimately mixing carbon dioxide gas with wheat flour dough in sealed mixing chambers where the dough becomes mixed with the gas which, when the bread is baked in the oven, expands and raises the bread just as when yeast or baking powder is used for the generation of carbon dioxide.

My process differs entirely from the above-outlined methods in that I subject the whole gas charged mass to high mechanical pressure and then force this material through a heating chamber and allow it to escape through an orifice where the compressed gas expands and assists the steam in puffing the material. Most of the moisture in the dough bricks escapes at the nozzle at the instant the pressure is reduced. What moisture remains is quickly given off in the oven. The product is sufficiently dried in one or two minutes. The design in using the carbon dioxide gas in conjunction with the steam is that the gas assists the steam in holding up the puffed cells or pores and preventing the material from collapsing in drying.

The use of the carbon dioxide increases the porosity of the material especially when a thicker ribbon, to be used in making crackers or the like, is desired. It has been found that when the desired product is to be from 1/4 to 3/4 of an inch thick, the use of carbon dioxide is desirable. When the product is thinner, around 1/16 of an inch, the use of carbon dioxide would be detrimental as it forms gas bubbles on the surface of the product, leaving the crust uneven and broken in places. This is especially true when a high charge of carbon dioxide is given to the dough bricks in the compression chamber.

When carbon dioxide is used and a low temperature is used in the heating chamber, but a well puffed and porous product is desired, then the carbon dioxide assists materially in the puffing process. Enough heat must be given to the material to cause it to become plastic and resistant, otherwise the carbon dioxide gas would tear the product to pieces at the nozzle or make a rough product. In cases where the wheat flour dough is in itself plastic, only a low heat is necessary, since the compressed carbon dioxide itself expands considerably without the aid of steam, enough to puff the material. The carbon dioxide gas acts instantly, at the nozzle, expanding the material and preventing its collapse, while drying in the oven.

*Example VI.*

Flour made from Indian corn is used. Water is added to bring the moisture content up to about 35 percent, making a plastic material. It does not form a dough but remains in a granular condition. This material is put in the compression chamber, sealed up and impregnated with carbon dioxide gas at a pressure of about 200 pounds per square inch. This gas pressure is maintained for a minute or two, during which time it becomes intimately incorporated in the corn flour mass. The minute particles and starch granules becoming gas saturated by diffusion.

A mechanical pressure of about 5000 pounds is now given the material which compresses it together with the carbon dioxide gas into a solid brick-like material. This is forced through the heating chamber which is kept at a temperature of about 375° F. by means of the steam jacket surrounding it. As the material escapes at the nozzle, inflation and puffing is effected by means of the expanding gas and steam. When the product is dried in the drying chamber, a puffed corn product in cracker or bread like form results.

*Example VII.*

Cleaned whole wheat is soaked in water from 12 to 24 hours. During this soaking the kernels swell considerably due to the water absorption. As much as 40 to 45 percent moisture will now be found in the grain. The excess water is then drained off. The wheat is now soft and can be worked into a dough. It is sufficiently plastic to be forced through the cooking tubes when placed in the compression chamber and subjected to a pressure of from 3000 to 5000 pounds, a temperature of about 375° F. being maintained in the steam jacket. The material escapes from the nozzle at a speed of one foot per second. As the material leaves the nozzle, it is extremely plastic for a few seconds, so that if a strip or shred is caught by the hand and carried on through the air at about the speed at which it escapes from the nozzle, a strip 10 to 20 feet long may be drawn out without its breaking off. When dried, the strips become brittle and break off. Any desired cross-section may be given to the strips or shreds, such as round, square, oblong and the like. As the material is plastic and of a rubbery soft consistency for a few second after it leaves the nozzle, it is very important that it shall be freely exposed to the hot air in the oven while setting so that its surface will be smooth on all sides when dry. To facilitate the free flow and smooth surface the apparatus is so arranged that the material leaving the nozzle flows out into the air and hangs suspended by its own gravity, falling down in a continuous stream onto a belt below which carries it through the oven at about the same speed as the speed of the material leaving the nozzle. When the material thus passes through the hot oven, all of its surfaces are exposed freely to the hot air at about 600° F., thus drying and setting all sides evenly and quickly.

It is clear that the extent of puffing or increase in size of the final product can be controlled by the temperature used for cooking the material as it is forced through the heating tubes. If only a slight porosity is desired, a temperature of around 225° F. is used. This is high enough to fuse the starch, causing it to bind together all the ingredients so that when dried the product is a hard shred or strip. Products thus made with a low temperature have minute pores and, therefore, are much less expanded and puffed than when a higher temperature around 375° F. is used. By this process a cooked food product is made from whole wheat grain without even grinding it into flour. Thus, "flourless" bread, or bread products, such as crackers can be made by this process.

*Example VIII.*

White potatoes containing as high as 75 percent water may be used. These are peeled and steamed converting them into a plastic or mashed form in which the starch is partly cooked. The material is placed in the compression chamber and subjected to a pressure of 2000 to 3000 pounds per square inch forcing it through the heating tubes. The puffing and drying take place as previously described.

In this connection it may be well to explain another result of the process when treating material such as potatoes having a high moisture content. Such a material, containing 75 percent water occupies about three times the volume which it occupies when air dry. When this material is forced through the heating tubes and escapes from the nozzle into the drying oven where a high temperature of around 600° F. is maintained a quick surface drying takes place, leaving the moisture inside the material practically intact. This sudden heating and drying of the surface of the material leaves a rigid shell like skin which now prevents the material from collapsing on further drying. As the material passes along the drying chamber, the temperature becomes less and less, the temperature at the outlet of the drying chamber being around 250 to 300° F. As the moisture which was on the inside of the material dries out, it leaves the material porous, the space occupied by the moisture before drying, forming innumerable pores which, as the material is being dried, are filled first with steam and finally with air.

Starch material products are slow conductors of heat, hence the interior or central portion of the material remains cooler than the surface long enough for the surface to dry and create a rigid crust or shell which prevents collapsing.

It may be explained here that the material in the drying chamber is not exposed to the high temperature more than 1/2 minute or so and during this time its temperature does not rise above 375 to 400° F., because the evaporation from this surface is so rapid at this point that it keeps itself sufficiently cool to prevent scorching.

*Example IX.*

Green bananas are used before their starch has turned into sugar. These are roasted, peeled and mashed. In this condition they contain about 70 percent moisture. They are put into the pressure chamber and forced through the heating chamber where a temperature of about 375° F. is maintained. When this material containing 70 percent moisture flows out of the nozzle at a temperature of 375° F. and a speed of about one foot per second, it is inflated by the volume of steam and forms a puffed product. The drying takes places as previously described, forming a crust on the strip which prevents the collapse of the porous material as it is dried.

This method of first causing the material to puff by steam inflation and then maintaining this inflation by high heat while drying causing a still greater porosity on account of the moisture loss, makes it possible to quickly treat in a continuous and economical way such plastic products as white and sweet potatoes, bananas and the like.

*Further explanation.*

It is evident that a wide range of temperatures may be given to the material, not only while being treated for cooking but also while being dried in the oven. I have found that cooking temperatures may vary between 225 and 400° F. and the oven drying and setting chambers may vary also, although 600° F. appears to be the best oven temperature to form a rigid setting crust. These variations of treatments permit the porosity of the resulting product to be made practically anything desired, from a product which is only slightly porous to a product in which the volume may be ten times that of the original.

This process provides an instantaneous method for disrupting starch granules of all kinds, regardless of origin. This is accomplished by means of a steam explosion inside of the starch granules themselves. This disruption is so instantaneous and explosive in its nature that for a few seconds after the disruption takes place, the starch is still in a plastic condition in which it can be molded, cut off and made into any desired shape. In other words, the starch is in a semi-dry paste form which, as it sets, acts as a binder for the other material mixed, thus fusing all of the material together allowing it to be molded, almost like dough.

The material as it escapes from the nozzle should be resistant to the escape of moisture and the pressure released should be sudden or instantaneous.

When the material escaping from the nozzle has a moisture content between 10 and 20 percent it dries itself on exposure to the air. When it is between 20 and 35 percent very little extra drying is needed, beyond a couple of minutes in a hot oven.

By my new method, materials containing a high percentage of moisture, as high as 75 percent, may be puffed and still remain swelled and porous when dry.

It is clear that when the material comes out of the nozzle, the moisture which has been heated to a temperature of 375° F. expands into steam instantly and inflates the material, puffing it up to several times its original volume.

If this condition of inflation temperature and live steam can be maintained and the temperatures even increased to drive off the surplus moisture, while still retaining inflation or puffed, a surface of crust will be formed on the material which will prevent the internal portion of the material from collapsing and shrinking.

This would cause a still greater porosity in the product when dry because of the drying out of the 75 percent of water. In drying there results, therefore, on the inside of the crusted material a shrinking up and porous formation, the solid pores fusing together into dividing membranes between pores.

To accomplish the desired quick drying, I proceed as follows: It has been found that a large percentage of the moisture is given off at the nozzle when the pressure reduction to atmospheric takes place. To continue this rapid drying and giving off of steam from the material, I keep the nozzles in the oven at a temperature of around 600° F. Furthermore, air at 600° F. is blown on the material so as to carry the moisture away as soon as it is given off. This high temperature not only acts to quickly dry the material but keeps the steam inside the material in its gaseous state and thus prevents the collapse of the material until the drying has continued to a point where the excess moisture is driven off and the cells have become rigid. This first instantaneous formation of a rigid crust-like surface on the material when expanded by the formation of steam I have called "setting" as it prevents the material from collapsing and retains the size and volume to which it was puffed.

It is clear that this method of rendering plastic material porous depends on two things: first, there takes place a steam expansion and inflation of the material (already enlarged on account of the relatively high moisture content) and, second, the puffed material is kept in its inflated enlarged size by means of a temperature higher than the temperature to which it was subjected in the heating chamber. The drying and evaporation is thus increased and the moisture further heated so as to keep it at or near the steam flash point. The material is then carried quickly through a dry oven having a decreasing temperature toward its outlet, the temperature decreasing from around 600° F. at the nozzle to a temperature of 225° F. at the outlet of the drying chamber. It has been found that as high as 50% of moisture can thus be taken out of the puffed material in from 2 to 3 minutes and 75% moisture material in five minutes. When dry the product thus made remains permanently porous and crisp. It can be stored and packed until used as food or other uses.

Having thus described my invention, what I claim is new and desire to secure by Letters Patent of the United States is:

1. A method of making a puffed product comprising reducing a material containing starch and moisture to a state in which it will flow under pressure, subjecting this material to pressure and heat to render it plastic, tenacious and resistant to the escape of moisture, causing the material to be released from pressure through an orifice to cause the moisture therein to expand as steam and thereby disrupt the starch granules and puff the material, and subjecting the material to heat as it emerges from said orifice to form a crust on the outside of the material and to maintain the moisture within the material in a gaseous state while the material is drying, to give it increased porosity.

2. A method of making a puffed product comprising reducing a material containing starch and moisture to a state in which it will flow under pressure, subjecting this material to pressure and heat to render it plastic, tenacious and resistant to the escape of moisture and causing the material to be released from pressure through an orifice to cause the moisture therein to expand as steam and thereby disrupt the starch particles and puff the material.

3. A method of making a puffed product comprising reducing a cereal to a dough that will flow under pressure, subjecting said dough to pressure and heat to render it plastic, tenacious and resistant to the escape of moisture and causing said dough to be released from pressure through an orifice to cause the moisture therein to expand as steam thereby puffing said dough.

4. A method of making a puffed product comprising reducing a cereal to a dough that will flow under pressure, subjecting said dough to pressure and heat to render it plastic, tenacious and resistant to the escape of moisture, causing said dough to be released from pressure through an orifice to cause the moisture therein to expand as steam thereby disrupting the particles of the dough and puffing it, and subjecting the thus puffed dough to heat as it emerges from said orifice to form a crust on the outside of the same and to maintain the moisture within the dough in a gaseous state while the same is drying to give it increased porosity.

5. A method of making a puffed product comprising reducing a farinaceous material containing moisture to a state in which it will flow under pressure, forcing carbon dioxide gas into said material under pressure, subjecting this material to pressure and heat to render it plastic, tenacious and resistant to the escape of moisture, causing the material to be released from pressure through an orifice to cause the moisture therein to expand as steam and to cause the compressed gas therein to expand and disrupt the particles of material thus puffing the material.

6. A method of making a puffed product comprising reducing a vegetable material containing moisture to a state in which it will flow under pressure, subjecting said material to pressure and heat, and causing the material to be released from pressure through an orifice to cause the moisture therein to expand as steam to puff the material.

7. A method of making a puffed product comprising reducing a cereal food material containing starch and gas to a state in which it will flow under pressure and impregnating it with gas, subjecting the material to pressure and heat and causing the material to be released from pressure through an orifice to cause the compressed gas therein to expand and puff the material.

8. The method of making a puffed cereal product which comprises reducing a cereal to a flowable state by admixture with water, incorporating with the mixture thus obtained a gaseous fluid under pressure, subjecting the thus combined materials to heat and pressure while confined in and flowing through a passage having an orifice open to the atmosphere at one end thereof, and causing said combined materials to issue from said orifice thus allowing the said gaseous fluid to expand and the water to vaporize.

9. The method of making a puffed cereal product which comprises reducing a cereal to a state in which it will flow under pressure; adding a gas to said cereal; confining said cereal and gas and heating the same while subjecting them to pressure; and extruding said heated admixed cereal and gas through an orifice to allow said gas to expand and puff said cereal.

10. A puffed porous food product characterized by substantial rigidity, highly cellular internal structure; considerable thickness relative to its other dimensions; and the presence of disrupted starch granules.

11. A puffed porous cereal product characterized by substantial rigidity; highly cellular internal structure; considerable thickness relative to its other dimensions; the presence of disrupted starch granules; and a crust on the outside of said product.

12. The process of producing pieces of puffed cooked cereal flour, which comprises forming a dough from said flour; cooking said dough while traversing closed tubes having extruding nozzles at one end; extruding the cooked dough from said nozzles to allow said dough to become puffed by the sudden evaporation of the moisture therein contained and form strips of puffed material; cutting the puffed dough strips into pieces; and toasting said pieces.

13. A process of puffing cereal dough which comprises extruding the dough through an orifice while heated to such a temperature that when extruded the moisture in such dough becomes steam thereby causing the dough to become puffed and form a coherent porous body whose cross sectional area is materially greater than the cross sectional area of the orifice through which it has been extruded.

14. A process of puffing cereal dough which comprises extruding the dough through an orifice while containing an expansible fluid that expands greatly upon reduction of pressure so that said fluid expands upon escaping through the orifice to puff the extruded material and cause it to become a coherent porous body whose cross sectional area is materially greater than the cross sectional area of the orifice through which it has been extruded.

In witness whereof, I have hereunto subscribed my name.

ALEXANDER P. ANDERSON.